United States Patent [19]

Mogilevsky et al.

[11] Patent Number: 4,986,652
[45] Date of Patent: Jan. 22, 1991

[54] COORDINATE GRID FOR A STEREOSCOPIC MEASURING DEVICE

[76] Inventors: Ilya M. Mogilevsky, skaya ulitsa, 20, kv. 286; Igor A. Vengerov, Seleznevskaya ulitsa, 30, korpus 3, kv. 46; Alexandr G. Gusar, Balaklavsky prospekt, 54, kv. 56, both of, Moscow; Konstantin A. Makarov, poselok Svetly, 27, kv. 9,, Moskovskaya oblast, Noginsky raion; Alexei E. Chebyshev, Leningradsky prospekt, 7I, kv. 42, Moscow, all of U.S.S.R.

[21] Appl. No.: 449,862
[22] PCT Filed: Apr. 14, 1989
[86] PCT No.: PCT/SU89/00093
  § 371 Date: Dec. 18, 1989
  § 102(e) Date: Dec. 18, 1989
[87] PCT Pub. No.: WO89/10537
  PCT Pub. Date: Nov. 2, 1989

[30] Foreign Application Priority Data
  Apr. 18, 1988 [SU] U.S.S.R. ................ 4411234
[51] Int. Cl.[5] ............................... G01C 11/06
[52] U.S. Cl. ................................. 356/2; 33/30.4
[58] Field of Search .............. 356/2; 33/1 A, 20.4

[56] References Cited
FOREIGN PATENT DOCUMENTS

| 3341087 | 5/1985 | Fed. Rep. of Germany . |
| 11160 | 9/1929 | U.S.S.R. . |
| 58420 | 11/1940 | U.S.S.R. . |
| 147779 | 5/1962 | U.S.S.R. . |

Primary Examiner—Richard A. Rosenberger
Attorney, Agent, or Firm—Burgess, Ryan & Wayne

[57] ABSTRACT

The invention relates to the stereophotogrammetry. A coordinate grid is made in the form of a support (1) carrying a stereophotograph of an image of one or more groups of straight lines (4) converging at a main point (3) and closed lines interconnecting them. The latter, according to the invention, are essentially circles (5) the centers of which are offset relatively the point (3) in one and the same radial direction by an amount of the parallax corresponding to the camera-to-object distance which is represented by the circle circumscribed from this center. The lines (4) and the circles (5) are made in the form of dash lines. The lengths of and the intervals between the dash lines, and the radii of the circles (5) determine the value of a grid division. The dash lines may be made colored and in each group of the lines the dashes have an individual color. The coordinate grid is mainly designed for use in stereoscopes for measuring stereophotographs of an object image.

2 Claims, 4 Drawing Sheets

COORDINATE GRID FOR A STEREOSCOPIC MEASURING DEVICE

TECHNICAL FIELD

The present invention relates to the stereo-photogrammetry, and in particular, it deals with a coordinate grid for a stereoscopic measuring device.

BACKGROUND OF THE INVENTION

Known in the art is a coordinate grid for a stereoscopic measuring device (SU, A, 147779) in the form of a support carrying a plurality of sterephotographs disposed in a succession and representing images of scales each in the form of a system of mutually perpendicular crossing straight lines. Each stereophotograph of this plutality of stereophotographs is made with a parallax and in a scale corresponding to a single specific range to the camera exposure station, i.e. to a distance from the camera exposure station to a single specific plane in the object space drawn normally with respect to the optical line of exposure.

A stereophotograph of an object is measured using the prior art coordinate grid in the following manner.

A film with a stereophotograph of an object (photograph to be measured) is mounted in a stereoscopic measuring device and is optically aligned with one of the measuring scales available on the support inserted in the device and carrying a plurality of stereophotographs with scale images. With the known measurement scale division, the range and dimensions of an object shown in the photograph are determined in that part thereof which corresponds to the specified range for a given scale. To determine the range and dimensions of objects available in other parts of the photograph, the support carrying stereophotographs of scales is moved with respect to the photograph to choose that scale which cann be visually brought in register with the object on the measured part of the photograph, and the actual dimensions and position of the object are determined in coordinates of this scale. In other words, in using the prior art coordinate grid, each change scale allows measurements to be carried out in a single specific plane of the object space only which is drawn normally with respect to the optical line. The prior art coordinate grid does not fill-up the photograph field in depth in the direction along the optical line of exposure. Measurements carried out by using the prior art coordinate grid are tedious and take much time. In addition, accuracy of measurements is limited by the discrete character of the series of design ranges of scales, and it is not possible to isolate objects for measurements within the space, e.g. density of biomass.

Also known in the art is a coordinate grid for a stereoscopic measuring device (DE, C, 3341087) in the form of a support carrying a stereophotograph of images of at least one group of straight lines converging at one and the same point and closed lines interconnecting them, the grid having divisions. The closed lines form contours, i.e. the grid is in the form of rectangles, intersection of straight lines, and its stereoscopic model is in the form of a three-dimensions rectilinear pattern with known nodal coordinates under binocular observation. When a stereoscopic image of an object is measured by means of this grid, dimensions of parts of the object can be determined simultaneously with different ranges thereto. Volumes for measurement, e.g. density of biomass may be isolated in the space as well. At the same time, accuracy of measurement which can be ensured using this grid depends on its spacing. With an increase in density of the grid accuracy of measurement is enhanced, but this also brings about the formation of phantom images in using the grid formed by straight lines (a similar phenomenon is known in the stereophotogrammetry as formation of a phantom relief) so as to limit accuracy of measurements. It should be also noted that in using grids formed by straight lines it is difficult to make corrections to grid dimensions to take into account distortion, especially in carrying out the exposure with short-focus lenses or in water which also results in a worse accuracy, especially in carrying out measurements in the marginal zones of the photograph.

SUMMARY OF THE INVENTION

The invention is based on the problem of providing a coordinate grid for a stereoscopic measuring device having such a configuration of lines forming the grid which would not result in the formation of phantom images with a high density of the grid so as to ensance accuracy of measurements.

The invention resides in that in coordinate grid for stereoscopic measuring device, comprising a support carrying a stereophotograph of an image of at least one group of straight lines converting at one and the same point and closed lines interconnecting the straight lines, the stereophotograph having divisions, according to the invention, the closed lines are in the form of circles having their centers offset with respect to the point of intersection of the straight lines and with respect to one another in one and the same radial direction, each circle corresponding to a preset distance from the camera exposure station, all the lines of the grid being in the form of dash lines, the dash lengths, intervals therebetween and radii of the circles determining the grid division.

To increase convenience of use of the grid, it is preferred that the grid comprise several groups of radial straight lines and circles interconnecting them in which circles corresponding to one and the same range are concentrical, the dashes being coloured to have an individual colour in each group of lines different from the colour of dashes of another group.

The coordinate grid for a stereoscopic measuring device according to the invention ensures a high accuracy of measurements (about 10%), rules out appearance of phantom images substantially with any density of grid, it is suited for making corrections for distortion as it only takes to make such corrections in determining radii of the circles. It is most preferred to make use of the embodiment of the coordinate grid in which dashes are of different colours as this allows zones of the object space to be isolated at different distances from the optical line in the radial direction.

The invention will now be described with reference to specific embodiments illustrated in the accompanying drawings, in which.

Figure 5:
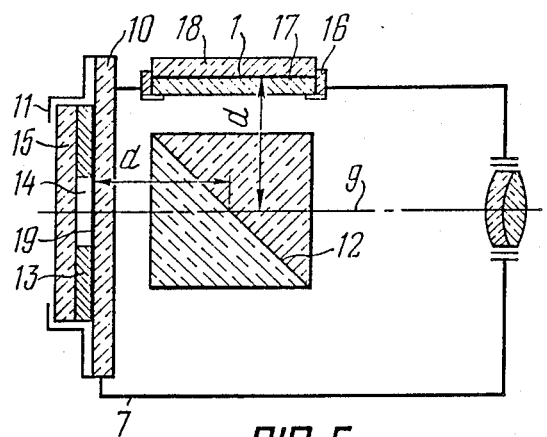
Figure 4:
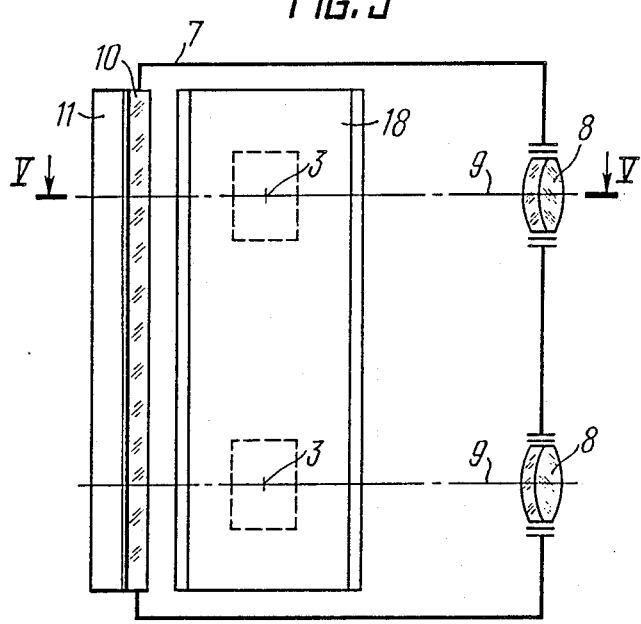

FIG. 4 diagrammatically shows a stereoscopic measuring device (a plan view);

FIG. 5 is a sectional view taken along line V—V in FIG. 4.

Figure 1:
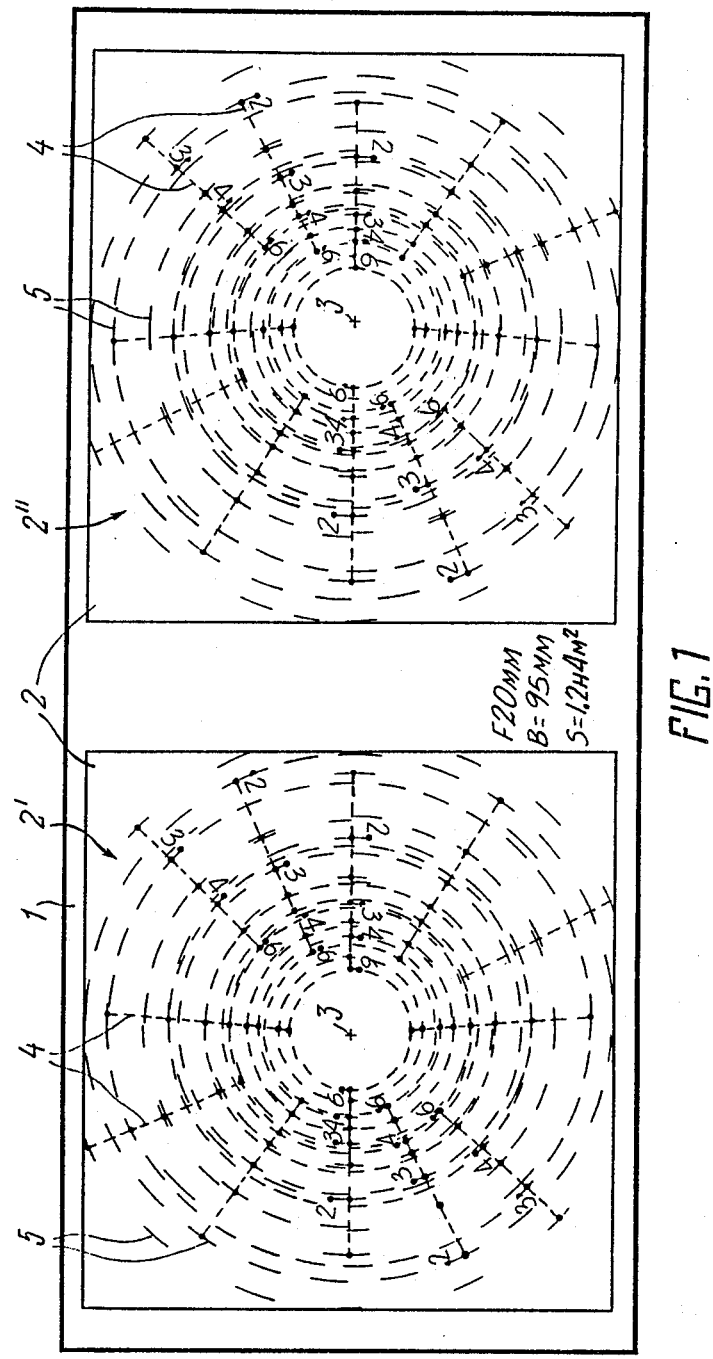
FIG. 1 shows a coordinate grid for a stereoscopic measuring device according to the invention.

A coordinate grid for a stereoscopic measuring device shown in FIG. 1 comprises a support 1 carrying a stereophotograph 2 of an image of at least one group, namely three groups of straight lines 4 converging at a single (main) point 3 and closed lines 5 interconnecting them. The stereophotograph 2 consists of two centrosymmetrical halves 2' and 2", the lefthand one and the righthand one, respectively.

Figure 2:
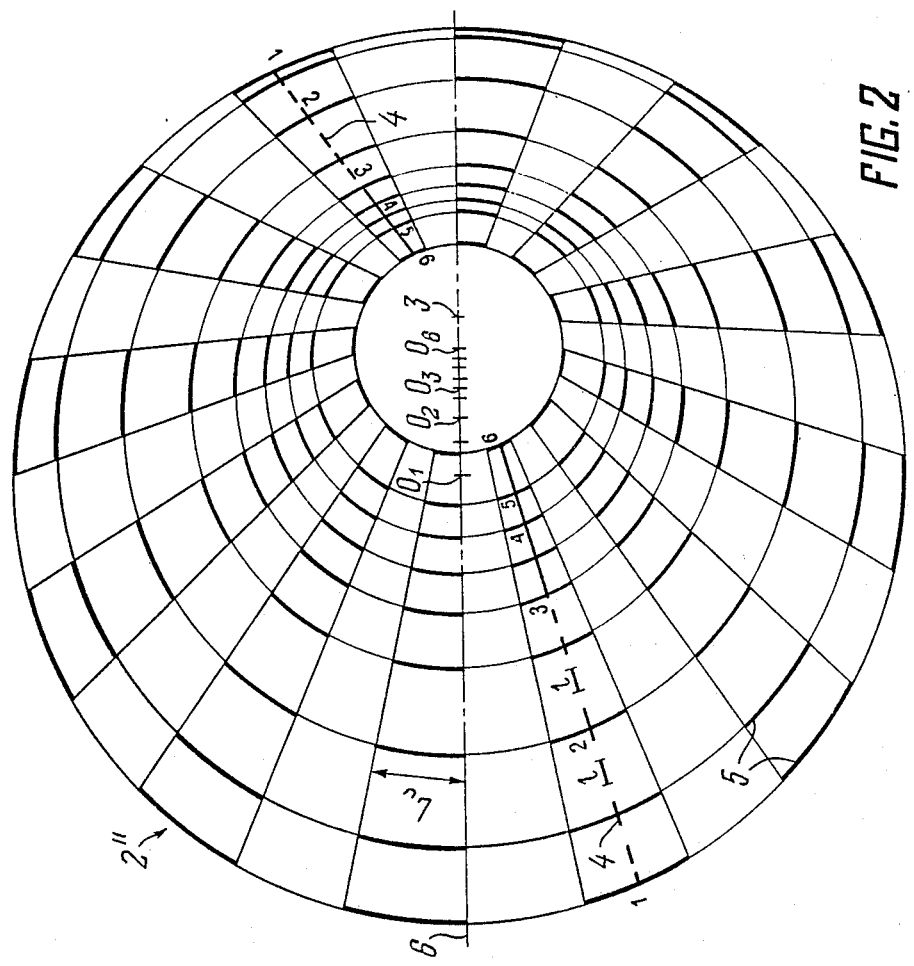
FIG. 2 shows an enlarged view of the righthand half of the coordinate grid shown in FIG. 1.

Let us consider in detail the righthand half 2" of the coordinate grid, the simplified version of which is shown in an enlarged view in FIG. 2. Then lines in FIG. 2 are auxiliary lines and are shown in the drawing to explain the concept behind plotting of the grid.

The half of the grid 2" shown in FIG. 2 is an image of one group of straight lines 4 converging at the main point 3 and closed lines 5 interconnecting them which are referred to below as circles 5. Centers $O_1$, $O_2$, $O_3$ . . . of the circles 5 are offset with respect to the main point 3 and with respect to one another in one and the same radial direction or along a horizontal axis 6 in this embodiment. The amount of the offset of the centers, $O_1$, $O_2$, $O_3$ is determined by one half of the amount of parallaxes P which are determined by the formula:

$$P = \frac{F \cdot B}{D}, \quad (1)$$

wherein
D is the range of the object of measurement to the camera exposure station reduced to air medium;
B is the photographic image basis of measured object;
F is the focal distance of the camera.

Each circle 5 corresponds to a single preset range to the camera exposure station. All the lines 4 and 5 of the grid are in the form of dash lines, the dashes and intervals being in the form of the grid divisions. Lengths l of dashes forming the lines 4, lengths $L_o$ of dashes forming the circles 5, lengths of intervals between the dashes, and radii of the circles 5 sets forth the grid division which is determined as the product of the dash or interval length by the scale of image of the dash or interval for a given range.

The grid is preferably made with light dashes against a dark background.

Figure 3:
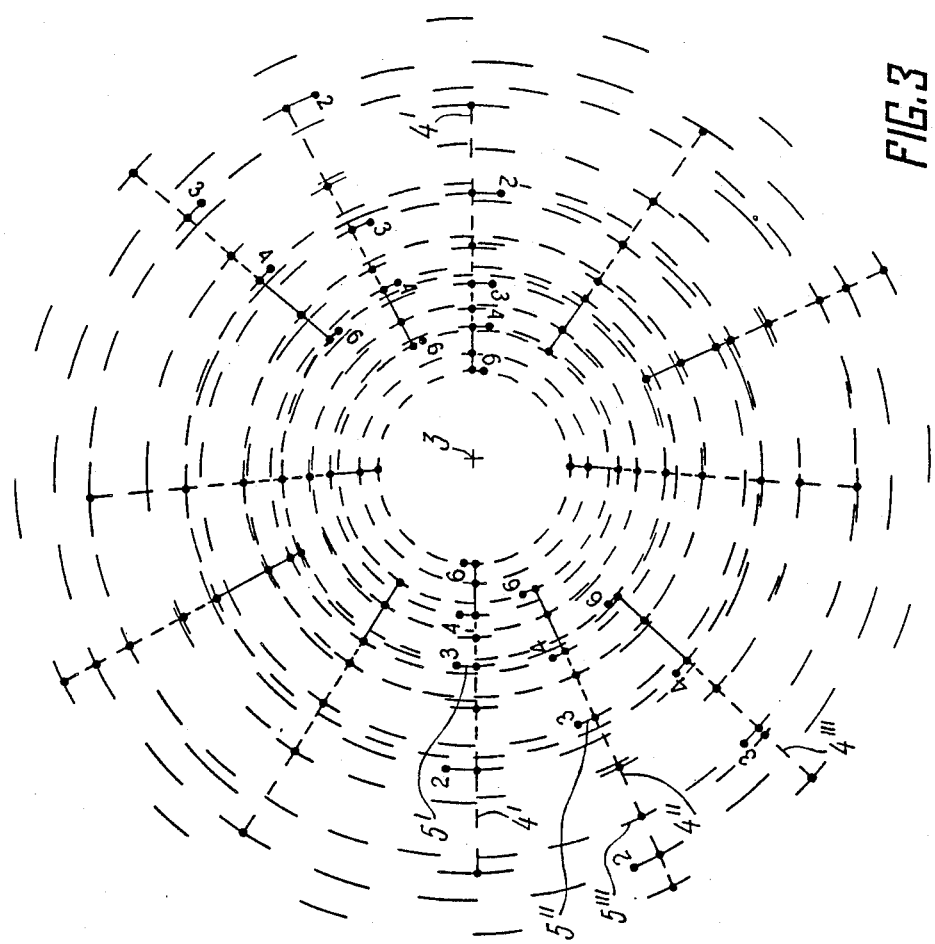
FIG. 3 is ditto of FIG. 2 for an embodiment of a coordinate grid having three groups of lines.

FIG. 3 shows an embodiment of the righthand half of the grid which, unlike the embodiment shown in the FIG. 2, comprises an image of three groups of radial lines 4', 4", 4''' converging at the main point 3 and circles 5', 5", 5''', respectively, interconnecting these lines. The circles 5', 5", 5''' in these groups corresponding to one end the same range (e.g. 1 m, 2 m, 3 m and the like) are concentrical.

Dashes in this embodiment of the grid are coloured, the dashes belonging to one and the same group of lines having one and the same colour different from colour of dashes of other groups. Thus, the dashes forming the group of lines 4' and circles 5' are blue, the dashes forming the group of lines 4" and the circles 5" are yellow, and the dashes forming the group of lines 4''' and the circles 5''' are red. The colour of the support is chosen to offer maximum contrast with respect to the colour of the dashes, e.g. it may be white, black or transparent. The dashes of all colours are of about identical brightness. Otherwise the operator might unconsciously give preference to dashes with most "comfort" brightness.

A process of making the coordinate grid according to the invention is carried out as follows.

One half 4 of the grid, e.g. the righthand half 2" (FIGS. 1, 2) is plotted. The second or lefthand half 2' is formed by turning the righthand half 2" at 180° in its plane about the main point 3. Both halves of the grid are mounted on the support 1 so that the main points 3 of both halves 2', 2" be located on one and the same, e.g. horizontal axis 6, the distance between the main points 3 along the axis 6 being strictly equal to the distance between the main points of the stereophotograph being measured.

Left us consider for example the plotting of one half of a coordinate grid for a photographic image basis of an object of measurement B=95 mm with the focal distance F=58.0 mm of the camera.

The range of ranges D to be measured and desired intervals in the direction of the optical line of exposure are determined, e.g., D=1.0; 1.5; 2.0; 2.5; 3.0; 4.0; 5.0; 6.0 m.

The preference of a series of areas of circles defined by the circles 5 for volumes in the object space or a series of lengths in planes drawn normally with respect to the optical line of exposure are determined. For example, for the purposes of investigations into hydrobionts, it is preferred to choose a series of areas, e.g. S=0.1; 0.25; and 1.0 m² (for an embodiment of a grid having three groups of lines).

Radii of the circles 5', 45", 5''' and lengths L of the circles in the object space are determined.

$$R = \sqrt{\frac{S}{\pi}} = 0.178;$$

0.282; 0.564 m (for F=58 mm without taking into account distortion).

The dash length $$L_u = \frac{2\pi R}{n},$$

wherein n is the number of dashes (intervals). As mentioned above, only one half of the grid is plotted, and the second half is formed by turning the first one at 180°. Therefore, taking into consideration the symmetry, the number of dashes is chosen as a multiple of 4. Then obtain, e.g.:

R'=0.178 m with n=32 $L_u$=37 mm

R''=0.282 m with n=48 $L_u$=37 mm

R'''=0.564 m with n=64 $L_u$=55 mm.

The amounts of parallaxes P/2 (as one-half value) are calculated by formula (1) for the chosen ranges.

The values of images of the radii $R_1'$, $R_1''$, $R_1'''$ in the coordinate grid are calculated by formula $R_1 = R \cdot M$, wherein M is the image scale, $$M = \eta \frac{F}{D},$$

wherein $\eta$ is the index of refraction of the medium in which the exposure is carried out. $\eta$=1.33 for exposure in water.

The table below gives values of parallaxes P and images of radii $R_1$ for a single group of straight lines 4' and circles 5' in which the radius $R'=0.173$ for preset values of ranges D in the object space calculated by the above formulae.

TABLE

| 1 | 2 | 3 | 4 | 5 |
|---|---|---|---|---|
| D, m | 1.0 | 1.5 | 2.0 | 2.5 |
| $R_1$, mm | 13.74 | 9.16 | 6.87 | 5.52 |
| P/2, mm | 2.56 | 1.71 | 1.28 | 1.02 |
| 1 | 6 | 7 | 8 | 9 |
| D, mm | 3.0 | 4.0 | 5.0 | 6.0 |
| $R_1$, mm | 4.58 | 3.43 | 2.76 | 2.29 |
| P/2, mm | 0.85 | 0.64 | 0.51 | 0.43 |

The procedure is then as follows.

A basis line is plotted on the support, which in this particular case is in the form of the horizontal axis 6 (FIG. 2) and the main point 3 is plotted on this line and the center $O_1$ is then obtained on the axis 6 at a distance 2.56 mm from the main point 3. The first circle 5' with the radius $R_1=13.74$ mm is drawn from the center $O_1$ to correspond to the range D=1 m. Then with a spacing of 1.71 mm from the point 3 along the axis 6, the center $O_2$ of the second circle 5' corresponding to the range D=1.5 m is obtained which is drawn with the radius $R_1=9.16$ mm, and then all ranges D given in Table are used in the similar manner.

Then at least two radial lines 4' intersecting at the main point 3 are drawn, the arcs of the circles 5' defined on one side by the horizontal axis 6 and on the other side by the lines 4' being equal pairwise for each circle 5'.

The circles 5' are drawn with dash lines (thick lines in FIG. 2) to abide to the above acalculated length $L_u$ of the dashes, and the straight lines 4 are also in the form of dash lines with the length I of the dash (intervals between the dashes) being a multiple of intervals between the chosen values of ranges. Thus, if the interval between the values of ranges is 0.5 m, it is preferred that the length I of the dash (interval between the dashes) be 1 1=0.1 m.

Calculations and plotting for the other two groups of lines in which straight radial lines 4" and 4'" converge at the same main point 3 and radii R" and R'" of the circles 5", 5'" in the object space are equal to 0.282 m and 0.564 m, respectively, are carried out in the same manner.

For carrying out measurements using the coordinate grid according to the invention, the use is made of a stereoscopic measuring device, e.g. a measuring stereoscope shown in FIGS. 4, 5.

The stereoscope comprises a box-shaped housing 7 having a pair of eyepieces 8 with a magnification of, e.g. 4.5$^x$ provided on a rear wall thereof having their parallel optical axes 9. The eyepieces are provided with a mechanism for adjusting their axis distance (not shown in the drawing). A photograph holder 11 for mounting a photograph to be measured in a plane drawn perpendicularly with respect to the optical axes 9 of the eyepieces 8 is provided adjacent to a transparent front wall 10 of the housing 7. A light splitter having a translucent mirror layer 12 is provided between the eyepieces 8 and the photograph holder 11 on one and the same optical axis with each of the eyepieces 8, the light splitter being one and the same for both eyepieces 8. The photograph holder 11 has a frame 13 with windows 14 and a light diffuser 16 provided upstream thereof. A grid holder 16 is provided in a top wall of the housing 7 and has a base 17 of the grid and a light diffuser 18, the grid holder ensuring the position of the grid in a plane drawn in parallel with the plane of the optical axes 9 of the eyepieces 8 at a distance d from the translucent layer 12 of the light splitter equal to a distance d from the layer 12 to the plane of the photograph mounted in the photograph holder 11.

Before carrying out measurements, the coordinate grid on the transparent support 1 is attached between the base 17 and the light diffuser 18. A photograph 19 to be measured is placed into the frame 13 of the photograph holder 11, the photograph being also made on a transparent support.

Light from the light diffuser 15 passes through the windowns 14, the stereophotograph of a measured object and translucent layer 12 forms in the eyepieces 8 a pair of magnified false images of the photographed object. At the same time, light from the light diffuser 18 passes through the support 1 having the coordinate grid applied thereto, is reflected from the translucent layer 12 and forms in the same eyepieces 8 a pair of magnified false three-dimensional images of the coordinate grid. A combined stereomodel of the photographed object and coordinate grid with respective scale figures can thus be observed through the eyepieces 8 of the device.

The coordinate grid made in the form of groups of coloured dash circles 5', 5", 5'" and straight lines 4', 4", 4'" against a dark background forms with the binocular observation a stereomodel of three coaxial differently coloured cylinders (blue, yellow and red). The circles 5', 5", 5'" represent cross-sections of these cylinders, and the straight lines 4', 4", 4'" represent generants thereof. Radii of the cylinders (cross-sectional areas) and lengths of dashes and intervals therebetween are determined by the measured object image scale. Coordinates of points of the photographed object are determined on the basis of known coordinates of coinciding or nearest dashes of the grid. Dimensions of projections of objects to a plane drawn normally with respect to the optical line are determined by visual comparison with known lengths of coinciding or nearest dashes or intervals of the circles. Dimensions of objects in the direction along the optical axis are determined by visual comparison with dashes or intervals of generants of the cylinders. Areas and volumes are determined by visual comparison with known areas of circles and volumes of the cylinders.

Therefore, the observation gives a three-dimensional image of the photographed object, e.g. of traffic situation or water environment and a three-dimensional image of the coordinate grid combined therewith.

Owing to the fact hthat the closed lines are in the form of the circles 5 in the coordinate grid according to the invention, the dashes forming these circles are substantially of different curvatures at all points of the grid so as to rule out the possibility of phantom images even with a very dense grid.

The coordinate grid according to the invention makes it possible to facilitate corrections to make up for distortion: it only takes to take into account the total value of distortion, e.g. of the lens, porthole and medium, in carrying out calculation of the radii $R_1'$, $R_1''$, $R_1'''$ or to compile a table of corrections for the grid calculated for the air medium which will also contribute to enhancement of accuracy of measurements achieved in using the above described coordinate grid.

When trained personnel make use of the grid according to the invention, maximum error in the direction along the optical line is $\delta_y = \pm 10\%$ and in a plane normal with respect to the optical line $\delta_{x,z} = \pm 10\%$ which is three times as low as in using non-filling and rather rare grids. The enhanced accuracy of measurements in the number of applications makes it possible to dispense with very labour-consuming measurements necessary to obtain confident statistical data.

Industrial Applicability

The present invention may be used in all cases when it is necessary to determine dimensions and arrangement in the space of an object by its stereophotograph or stereoscopic image formed by the stereoscopic, measuring device when investigating underwater objects for certification and safequarding of monuments of culture, in speleology in archeology, in museum research work, in the criminal law, in sport for analysis of specific motions of sportsmen, and so forth.

We claim:

1. A coordinate grid for a stereoscopic measuring device made in the form of a support (1) carrying a stereophotograph of an image of at least one group of straight lines (4) converging at one point and closed lines interconnecting them, and having divisions, c h a r a c t e r i z e d in that the closed lines are essentially circles (5) the centers of which ($O_1$, $O_2$, $O_3$ . . .) are offset relatively to the point (3) of intersection of the straight lines (4) and also relatively to one another in one and the same radial direction, and each of which corresponds to a definite camera-to-object distance, and all the grid lines are made in the form of dash lines, the lengths (L,l) of the dashes, intervals therebetween and the radii of the circles determine the value of a grid division.

2. A coordinate grid according to claim 1, c h a r a c t e r i z e d in that it comprises a plurality of groups of straight radial lines (4', 4", 4"') and circles (5', 5", 5"') interconnecting them, wherein the circles (5', 5", 5"') corresponding to one and the same camera-to-object distance are concentrical, the dashes are made coloured and in each group of lines the dashes have their individual colour different from the colour of dashes in another group.

* * * * *